United States Patent
Yanagisawa

[11] Patent Number: 5,272,543
[45] Date of Patent: Dec. 21, 1993

[54] METHOD AND SYSTEM FOR REPRODUCING NATURAL IMAGE

[75] Inventor: Takeshi Yanagisawa, Kawasaki, Japan

[73] Assignee: Fujitsu Limited, Kawasaki, Japan

[21] Appl. No.: 705,511

[22] Filed: May 24, 1991

[30] Foreign Application Priority Data

May 24, 1990 [JP] Japan .................................. 2-132608

[51] Int. Cl.⁵ .............................................. H04N 1/00
[52] U.S. Cl. .................................. 358/403; 358/426; 358/261.4; 358/166
[58] Field of Search ................ 358/467, 444, 447, 443, 358/448, 403, 401, 425, 426, 427, 261.1, 261.2, 261.3, 261.4; 340/731; 799

[56] References Cited

U.S. PATENT DOCUMENTS

| | | | |
|---|---|---|---|
| 4,222,076 | 9/1980 | Knowlton | 358/429 |
| 4,261,018 | 4/1981 | Knowlton | 358/426 |
| 4,472,736 | 9/1984 | Ushio et al. | 358/467 |
| 4,692,806 | 9/1987 | Anderson et al. | 358/108 |
| 4,698,675 | 10/1987 | Casey | 358/140 |
| 4,969,204 | 11/1990 | Melnychuck et al. | 358/426 |
| 5,124,811 | 6/1992 | Ohsawa et al. | 358/448 |

FOREIGN PATENT DOCUMENTS

| | | |
|---|---|---|
| 180389 | 9/1985 | Japan . |
| 167569 | 7/1988 | Japan . |
| 297050 | 11/1989 | Japan . |
| 42672 | 2/1990 | Japan . |

*Primary Examiner*—Edward L. Coles, Sr.
*Assistant Examiner*—Fan Lee

[57] ABSTRACT

A method of progressively reproducing a natural image successively decodes and displays data which are stored in a memory in at least three stages including display of a retrieval image which is used for giving a general idea of the image, a soft copy image which has a sufficiently high resolution for display and a hard copy image which has a sufficiently high resolution for printing. The data stored in the memory includes at least retrieval image data which is obtained by coding the natural image, soft copy image data which is obtained by coding a difference of the retrieval image and the soft copy image and hard copy image data which is obtained by coding a difference of the soft copy image and the hard copy image. The method comprises the steps of (a) decoding the retrieval image data read out from the memory to display a retrieval image, (b) decoding the soft copy image data and a predetermined part of the hard copy image data read out from the memory to display a soft copy image in which a predetermined part thereof is replaced by a hard copy image part which is described by the predetermined part of the hard copy image data, (c) decoding the hard copy image data read out from the memory to display a hard copy image excluding the hard copy image part, and (d) printing the hard copy image based on the hard copy image data decoded in the steps (b) and (c).

15 Claims, 9 Drawing Sheets

FIG. IC PRIOR ART

PRIOR ART   PRIOR ART   PRIOR ART

FIG.5
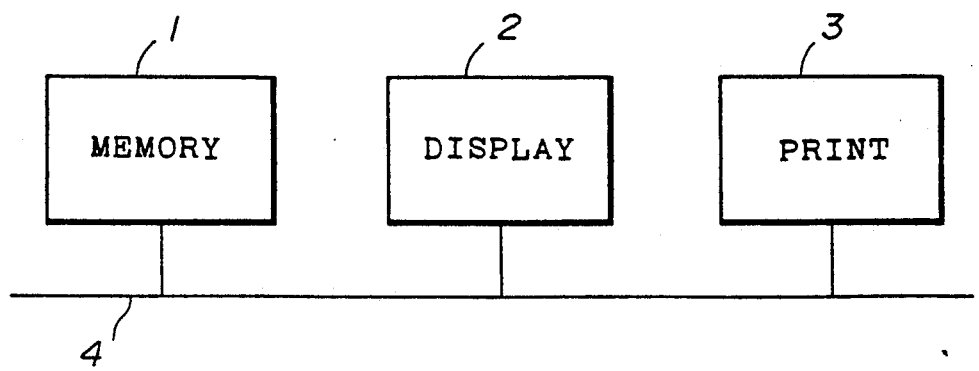
FIG.6A  FIG.6B  FIG.6C
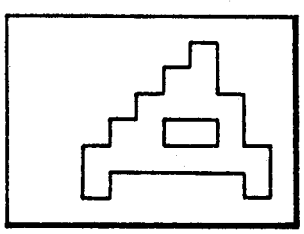 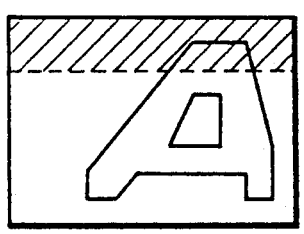 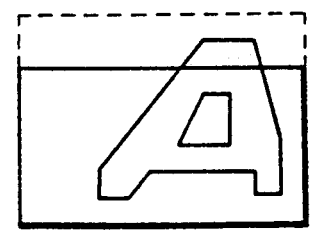

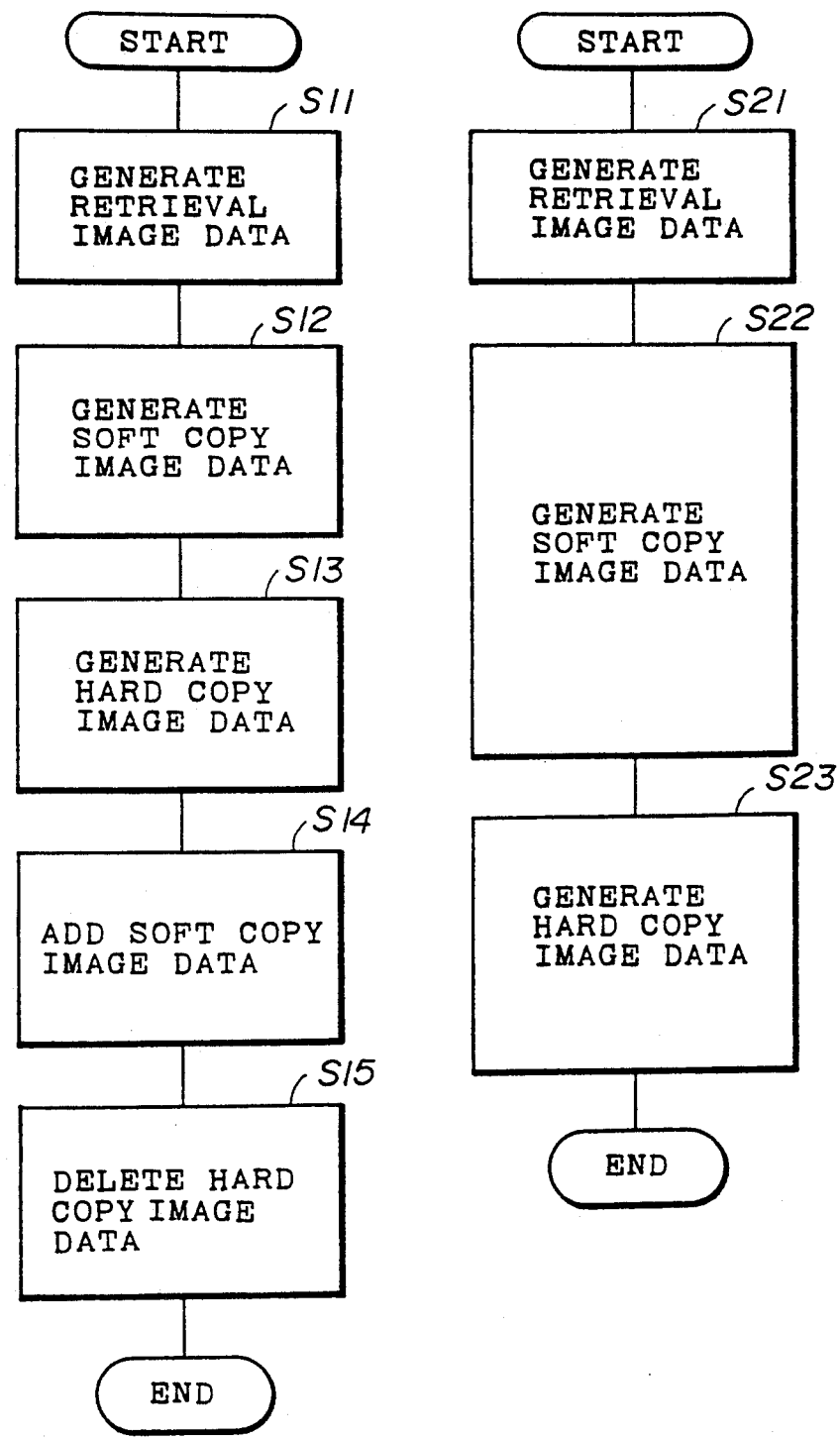

METHOD AND SYSTEM FOR REPRODUCING NATURAL IMAGE

BACKGROUND OF THE INVENTION

The present invention generally relates to image reproduction methods and systems, and more particularly to a natural image reproduction method and system applicable to displaying and printing of a still image.

Unlike character information and graphic information, the information quantity of the natural or multi-level image is considerably large. For this reason, the natural image information is normally stored in a coded and compressed form.

When storing the natural image information in the compressed form, there is a demand to shorten the processing time when displaying or printing the natural image information which is stored in the compressed form.

Conventionally, the natural image information is stored in the coded and compressed form using a coding system such as the adaptive discrete cosine transform (ADCT) coding and the generalized block truncation coding (GBTC). In such cases, the natural image information is compressed with a compression rate on the average of 1/10.

However, the information quantity is still large even after the coding described above. For example, in the case of the natural image information related to 600×400 pixels, the information quantity after the coding is approximately 80 kbits. On the other hand, when the natural image is displayed by the simple operation of successively restoring the coded data, it takes approximately 10 seconds to display the natural image of the 600×400 pixels. For this reason, the coding is first carried out with respect to the rough image in its entirety, and the coding is thereafter carried out with respect to the fine image.

When displaying the natural image which is coded in two stages as described above, the rough image is first displayed so that the general image information can be recognized, and the fine image is thereafter displayed gradually with time. Such a method of reproducing the stored image information is called a progressive display. The progressive display itself is known from Trikepse SS 9, pp.193-196, for example.

FIGS. 1A, 1B and 1C respectively show photographs of a natural image which is displayed by the progressive display. The display is made in a sequence starting from the image shown in FIG. 1A to the final image shown in FIG. 1C, where the image shown in FIG. 1B is finer than that shown in FIG. 1A and the final image shown in FIG. 1C is finer than that shown in FIG. 1B.

The progressive display method can roughly be divided into three display steps.

FIGS. 2A, 2B and 2C respectively show a natural image which is represented by the three display steps of the progressive display method. The image becomes finer in the sequence of FIGS. 2A, 2B and 2C. FIG. 2A shows a retrieval image which is used to obtain a general idea of the image, and it takes approximately 3 seconds to display such a rough image. FIG. 2B shows a displaying image which is used for display on a display device such as a cathode ray tube (CRT), and it takes approximately 10 seconds to display such a soft copy image. FIG. 2C shows a printing image which is to be printed, and it takes approximately 20 seconds to display such a hard copy image. Although the display of the hard copy image can be obtained in less than one minute, if no display were made during this time, the user may think that something is wrong. In addition, the waiting time of less than one minute may seem very long to the user when no display is made during this time. Hence, it is very helpful to display the retrieval image first so that the user is aware of the process which is being made.

FIG. 3 shows a conventional image data compression process. A step S1 generates the retrieval image data for the entire image by coding the natural image data. A step S2 generates the soft copy image data for the entire image by coding the difference between the retrieval image and the soft copy image. A step S3 generates the hard copy image data for the entire image by coding the difference between the soft copy image and the hard copy image.

For example, the compressed image data are stored in a memory as shown in FIG. 4. The retrieval image data, the soft copy image data and the hard copy image data are respectively stored in files RI, SI and HI. These image data are read out and decoded when displaying and/or printing the hard copy image.

When the information quantity of the retrieval image data is taken as being "1", the information quantity of the soft copy image data is "2.5" and the information quantity of the hard copy image data is "3.75".

The retrieval image is restored by decoding the retrieval image data. The soft copy image is restored by decoding the soft copy image data and adding the restored data to the restored data related to the retrieval image. The hard copy image is restored by decoding the hard copy image data and adding the restored data to the restored data related to the soft copy image.

The soft copy image and the hard copy image cannot be distinguished from each other when displayed on the display device due to the relatively poor resolution of the display device. However, when printing the natural image, the soft copy image cannot be used and it is essential to use the hard copy image because of the high resolution required in the printer. As a result, it is necessary to wait for the hard copy image to be restored before starting the printer, and there is a problem in that the printing time as a whole becomes relatively long due to the waiting time.

SUMMARY OF THE INVENTION

Accordingly, it is a general object of the present invention to provide novel and useful image reproduction method and system in which the problem described above is eliminated.

Another and more specific object of the present invention is to provide a method of progressively reproducing a natural image by successively decoding and displaying data which are stored in memory means in at least three stages, where the three stages include display of a retrieval image which is used for giving a general idea of the image, a soft copy image which has a sufficiently high resolution for display on display means and a hard copy image which has a sufficiently high resolution for printing on printer means, and the data stored in the memory means include at least retrieval image data which is obtained by coding the natural image, soft copy image data which is obtained by coding a difference of the retrieval image and the soft copy image and hard copy image data which is obtained by coding a difference of the soft copy image and the hard copy image, which method comprises the steps of (a) decoding the retrieval image data read out from the memory means to display a retrieval image on the display means, (b) decoding the soft copy image data and a predetermined part of the hard copy image data read out from the memory means to display on the display means a soft copy image in which a predetermined part thereof is replaced by a hard copy image part which is described by the predetermined part of the hard copy image data, (c) decoding the hard copy image data read out from the memory means to display on the display means a hard copy image excluding the hard copy image part, and (d) printing the hard copy image on the printer means based on the hard copy image data decoded in the steps (b) and (c). According to the method of the present invention, it is possible to improve the data processing speed when printing the hard copy image, and the printing of the hard copy image can be started before the entire hard copy image is restored.

Still another object of the present invention is to provide a natural image reproduction system for progressively reproducing a natural image by successively decoding and displaying stored data in at least three steps, the three steps including display of a retrieval image which is used for giving a general idea of the image, a soft copy image which has a sufficiently high resolution for display and a hard copy image which has a sufficiently high resolution for printing, which natural image reproduction system comprises display means, printer means, memory means for storing at least retrieval image data which is obtained by coding the natural image, soft copy image data which is obtained by coding a difference of the retrieval image and the soft copy image and hard copy image data which is obtained by coding a difference of the soft copy image and the hard copy image, decoding means for decoding the data stored in the memory means, a bus coupled to the display means, the printer means, the memory means and the decoding means, and control means, coupled to the bus, for controlling a read operation of the memory means, a decoding operation of the decoding means and transfer of data on the bus. The control means controls the decoding means so that the three stages include decoding the retrieval image data read out from the memory means to display a retrieval image on the display means, decoding the soft copy image data and a predetermined part of the hard copy image data read out from the memory means to display on the display means a soft copy image in which a predetermined part thereof is replaced by a hard copy image part which is described by the predetermined part of the hard copy image data, and decoding the hard copy image data read out from the memory means to display on the display means a hard copy image excluding the hard copy image part. The control means controls the printer means to print the hard copy image based on the hard copy image data decoded in the decoding means. According to the system of the present invention, it is possible to improve the data processing speed when printing the hard copy image, and the printing of the hard copy image can be started before the entire hard copy image is restored.

Other objects and further features of the present invention will be apparent from the following detailed description when read in conjunction with the accompanying drawings.

BRIEF DESCRIPTION OF THE DRAWINGS

FIGS. 1A, 1B and 1C respectively show photographs of a natural image which is displayed by the progressive display;

FIG. 5 is a system block diagram for explaining an operating principle of the present invention;

FIGS. 6A, 6B and 6C are diagrams for explaining an embodiment of an image reproduction method according to the present invention;

FIG. 8 is a flow chart for explaining a first data compression process;

FIG. 10 is a flow chart for explaining a second data compression process;

DESCRIPTION OF THE PREFERRED EMBODIMENTS

Figure 1A:
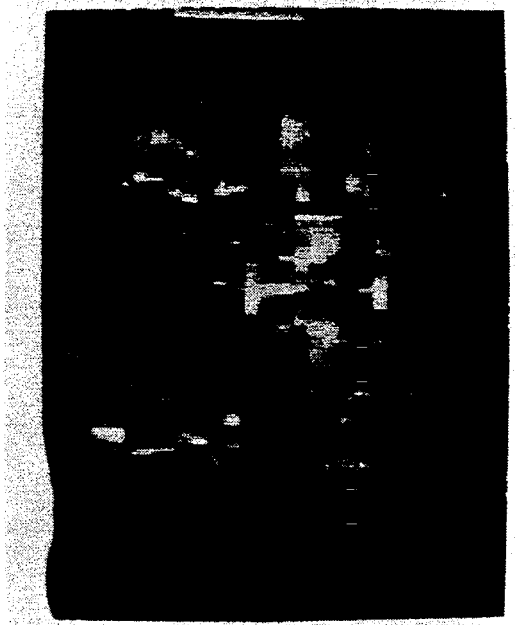
Figure 1B:

First, a description will be given of an operating principle of the present invention, by referring to FIG. 5. FIG. 5 shows a memory 1, a display device 2 and a printer 3 which are coupled via a bus line 4.

The natural image is coded and compressed, and the memory 1 stores at least retrieval image data, soft copy image data and hard copy image data in accordance with the progressive display. The retrieval image is used to obtain a general idea of the image and has a relatively low resolution. The soft copy image is used for display and has a sufficiently high resolution for the display. The hard copy image is used for printing and has a sufficiently high resolution for the printing. The display device 2 displays the image which is read out from the memory 1 and restored (decoded), and the printer 3 prints the image which is read out from the memory 1 and restored.

When displaying the soft copy image on the display device 2, a part of the hard copy image is displayed. In addition, when restoring the hard copy image, the hard copy image is restored except for the part which is already displayed together with the soft copy image.

The printer 3 is started to start printing the hard copy image at the same time as when the part of the hard copy image starts to be displayed on the display device 2 together with the soft copy image. Furthermore, the remaining part of the hard copy image is read out from the memory 1 and restored, and is transferred to the printer 3.

In order to display the part of the hard copy image together with the soft copy image, the data related to the part of the hard copy image is automatically transferred after transferring the data related to the soft copy image so that the part of the hard copy image is displayed in place of a corresponding part of the soft copy image. Alternatively, the data related to the part of the hard copy image may be stored in the memory 1 together with the data related to the soft copy image, and the soft copy image including the part of the hard copy image may be displayed so that the part of the hard copy image is displayed in place of the corresponding part of the soft copy image.

On the other hand, when transferring the data related to the hard copy image which is to be printed after displaying the soft copy image, the data related to the soft copy image and the hard copy image may be stored in independent files within the memory 1. In this case, the hard copy image can be printed by reading out the contents of the file which corresponds to the hard copy image. Alternatively, the data related to the soft copy image and the hard copy image may be managed as a single file within the memory 1. In this latter case, the transfer of the hard copy image data waits after the transfer of the soft copy image data, and the hard copy image is printed by transferring the contents of the hard copy image data when printing the hard copy image.

Because a part of the hard copy image is displayed when displaying the soft copy image and the data related to the remaining part of the hard copy image is restored when restoring the hard copy image, it is possible to start the printer 3 when the restoration of the soft copy image data ends, and the data related to the remaining part of the hard copy image is thereafter restored and transferred to the printer 3. For this reason, it is possible to improve the processing speed when printing the hard copy image, particularly in a case where the soft copy image is displayed prior to the printing.

It is possible to start the printer 3 simultaneously as the start of the display of the part of the hard copy image together with the soft copy image so as to start printing the hard copy image, and the data related to the remaining part of the hard copy image within the memory 1 can be restored and simultaneously transferred to the display device 2 and the printer 3.

Figures 2A, 2B, 2C:
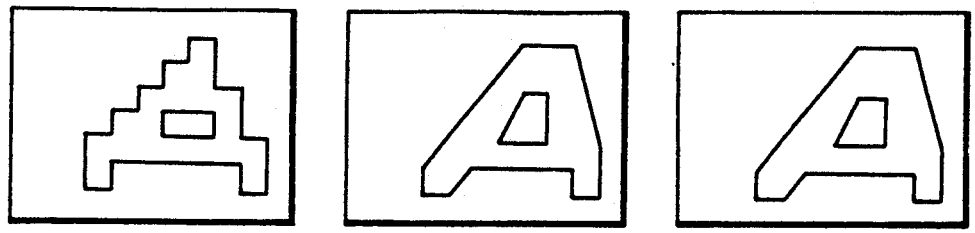
FIGS. 2A, 2B and 2C respectively show a natural image which is represented by the three display steps of the progressive display method.
Figure 3:
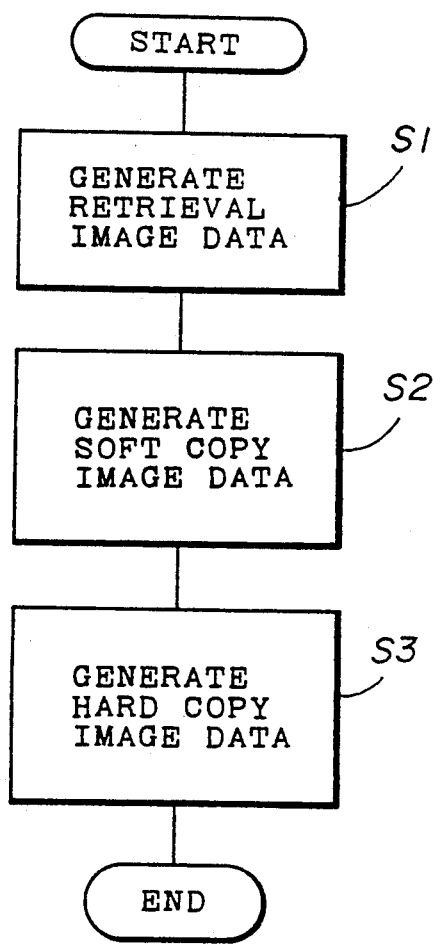
FIG. 3 is a flow chart for explaining a conventional image data compression process.

FIGS. 6A, 6B and 6C are diagrams for explaining an embodiment of the image reproduction method according to the present invention. FIG. 6A shows a retrieval image, and the contents of a file corresponding to this retrieval image is similar to the coded information related to the image shown in FIG. 2A. FIG. 6B shows a soft copy image, and the contents of a file corresponding to this soft copy image is the information which is obtained by coding the difference between the coded information similar to that related to the image shown in FIG. 2A and the coded information similar to that related to the image shown in FIG. 2B. However, in the file corresponding to the soft copy image, an upper part A of the soft copy image shown in FIG. 6B corresponds to the hard copy image shown in FIG. 2C. FIG. 6C shows a hard copy image, and the contents of a file corresponding to this hard copy image is the information which is obtained by coding the difference between the coded information similar to that related to the image shown in FIG. 2B and the coded information similar to that related to the image shown in FIG. 2C. However, in the file corresponding to the hard copy image, an upper part B of the hard copy image shown in FIG. 6C contains no data.

In this embodiment of the method, the retrieval image shown in FIG. 6A is first displayed by restoring (decoding) the file corresponding to the retrieval image. Then, the soft copy image shown in FIG. 6B is displayed by restoring the file corresponding to the soft copy image and adding the restored data to the data of the retrieval image. But since the file corresponding to the soft copy image includes the data related to a part of the hard copy image, the upper part A of the soft copy image is the hard copy image.

The printing of the hard copy image starts after the soft copy image is displayed. The hard copy image is displayed by restoring the file corresponding to the hard copy image and adding the restored data to the data of the soft copy image. But because the file corresponding to the hard copy image does not include the data related to the upper part B of the hard copy image, the data restoration is carried out only for the data related to the hard copy image excluding the upper part B. The printing of the hard copy image progresses as the restoration of the hard copy image progresses.

Figure 7:
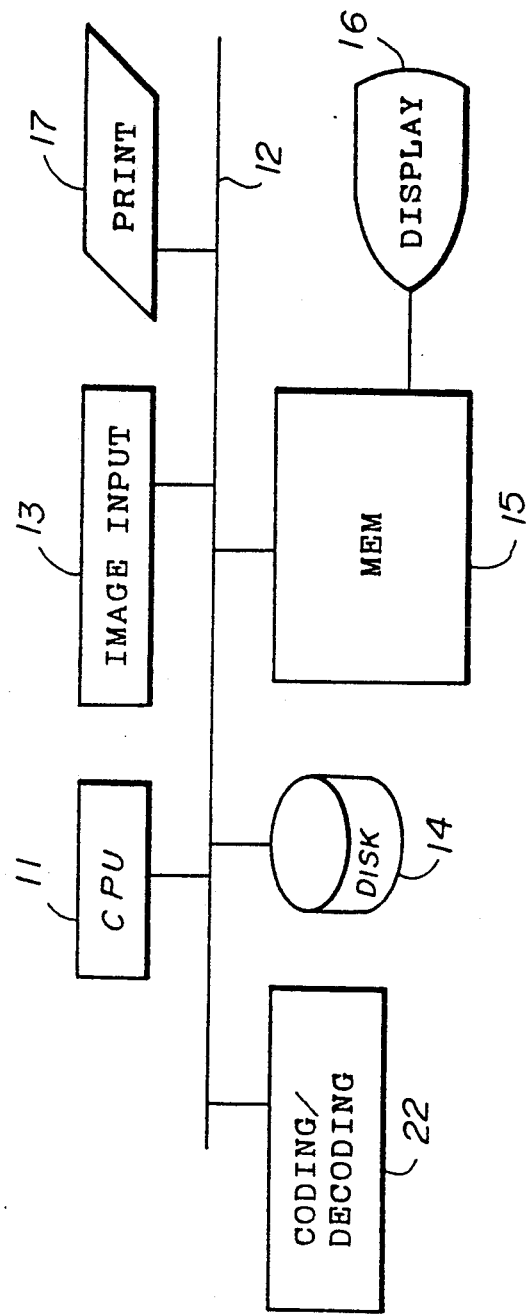
FIG. 7 is a system block diagram showing a first embodiment of an image reproduction system according to the present invention.

FIG. 7 shows a first embodiment of the image reproduction system according to the present invention. The image reproduction system includes a central processing unit (CPU) 11, a bus 12, an image input device 13, an external memory device 14, a display memory 15, a display device 16 such as a CRT, a printer 17 such as a color printer, and a coding/decoding part 22.

When storing the image, the image input device 13 reads a natural image and codes the natural image in the coding/decoding part 22 as described above in conjunction with FIGS. 6A through 6C. The coded data related to a retrieval image, a soft copy image and a hard copy image are stored in the external memory device 14.

When displaying the image, the coded data are read out from the external memory device 14, and the coding/decoding part 22 decodes the coded data in the coded sequence. The decoded image data related to the retrieval image, the soft copy image and the hard copy image are stored in the display memory 15. In addition, the decoded image data are read out from the display memory 15 and successively displayed on the display device 16.

When printing the image, the decoded image data related to the hard copy image is read out from the display memory 15. The read image data is transferred to the printer 17 which carries out a printing process.

In the image reproduction system shown in FIG. 7, the bus 12 may be used in time division, so that the process of storing the image data and the process of displaying the image data can be carried out simultaneously.

A description will now be given of the display and printing processes of this embodiment.

(1) Displaying the Soft Copy Image:

First, the coded information corresponding to the retrieval image is restored and stored in the display memory 15 and is displayed on the display device 16. The retrieval image may be displayed in one step or in a plurality of steps.

The contents of the image to be displayed are confirmed by monitoring the retrieval image. If the retrieval image is not the image to be displayed, the display is cancelled from a keyboard (not shown), for example, so as to display another retrieval image. The keyboard may be coupled to the display device 16. On the other hand, if the retrieval image is the image to be displayed, the soft copy image is restored and displayed. When displaying the soft copy image, the information related to a part of the hard copy image is transferred to the corresponding part of the soft copy image. Various methods may be employed when transferring the data related to the part of the hard copy image.

According to a first transferring method, the data related to the part of the hard copy image is transferred automatically after transferring the soft copy image.

According to a second transferring method, the data related to the part of the hard copy image is added to the data related to the soft copy image, and the soft copy image including the part of the hard copy image is displayed in one step at the time of the restoration.

(2) Displaying the Hard Copy Image (Printing):

First, the restored information related to the part of the hard copy image and stored in the display memory 15 is transferred to the printer 17 to start the printing process. At the same time, the information related to the remaining part of the hard copy image stored in the external memory device 14 is restored and stored into the display memory 15. In addition, this information related to the remaining part of the hard copy image is read out from the display memory 15 and transferred to the printer 17. At the same time, the display device 16 displays the remaining part of the hard copy image. Various methods may be employed when transferring the data related to the hard copy image.

According to a first transferring method, the data related to the soft copy image and the hard copy image are stored in independent files, and the file corresponding to the hard copy image is read out when carrying out the printing process.

According to a second transferring method, the data related to the soft copy image and the hard copy image are managed in a single file. The transfer of the data related to the hard copy image waits after the transfer of the soft copy image data, and the hard copy image is printed by transferring the hard copy image data when printing the hard copy image.

FIG. 8 shows a first data compression process which may be employed in this first embodiment of the system. When this first data compression process is employed, a step S11 generates the retrieval image data for the entire image by coding the natural image data. A step S12 generates the soft copy image data for the entire image by coding the difference of the retrieval image and the soft copy image. A step S13 generates the hard copy image data for the entire image by coding the difference of the soft copy image and the hard copy image. A step S14 adds the hard copy image data corresponding to a predetermined number of lines of the hard copy image to the soft copy image data. A step S15 deletes the hard copy image data corresponding to the predetermined number of lines from the hard copy image data related to the entire image.

Figure 9:
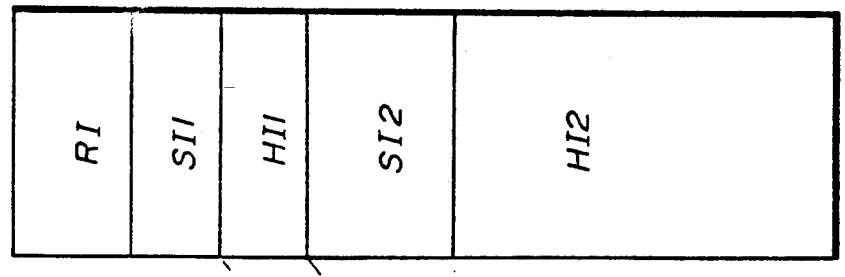
FIG. 9 is a diagram for explaining the storage of the retrieval image, soft copy image and hard copy image data when the first data compression process is employed.
Figure 4:
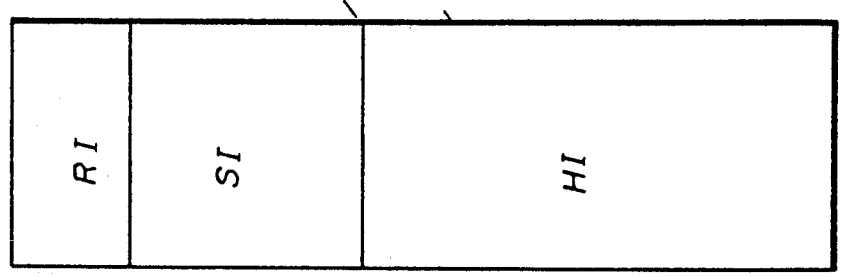
FIG. 4 is a diagram for explaining the storage of retrieval image, soft copy image and hard copy image data when the conventional image data compression process is employed.

FIG. 9 shows a memory map of the external memory device 14 for a case where the first data compression process is employed. The retrieval image data is stored in a file RI. The soft copy image data is stored in a file SI which is made up of SI1 and SI2. SI1 stores the soft copy image data corresponding to a number of lines of the soft copy image, and SI2 stores the soft copy image data corresponding to the remaining part of the soft copy image. The hard copy image data is stored in a file HI which is made up of HI1 and HI2. HI1 stores the hard copy image data corresponding to the predetermined number of lines of the hard copy image, and HI2 stores the hard copy image data corresponding to the remaining part of the hard copy image.

FIG. 10 shows a second data compression process which may be employed in this first embodiment of the system. When this second data compression process is employed, a step S21 generates the retrieval image data for the entire image by coding the natural image data. A step S22 generates the soft copy image data for the entire image by coding the difference of the retrieval image and the soft copy image and generates the hard copy image data for the predetermined number of lines of the hard copy image by coding the difference of corresponding parts of the soft copy image and the hard copy image. A step S23 generates the hard copy image data corresponding to the remaining part of the hard copy image excluding the predetermined number of lines by coding the difference of corresponding parts of the soft copy image and the hard copy image.

Figure 11:
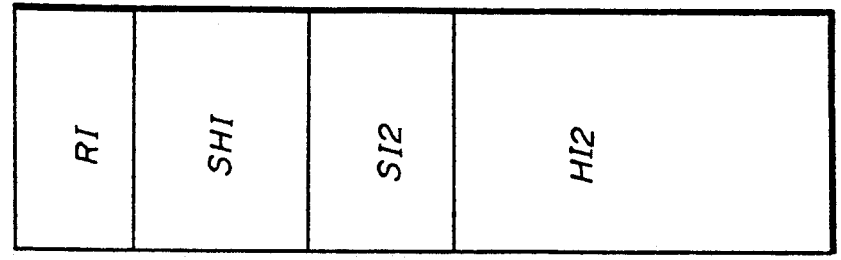
FIG. 11 is a diagram for explaining the storage of the retrieval image, soft copy image and hard copy image data when the second data compression process is employed.

FIG. 11 shows a memory map of the external memory device 14 for a case where the second data compression process is employed. The retrieval image data is stored in a file RI. The soft copy image data is stored in a file which is made up of SHI and SI2. SHI stores the hard copy image data corresponding to the predetermined number of lines of the hard copy image, and SI2 stores the soft copy image data corresponding to the remaining part of the soft copy image. The hard copy image data is stored in a file HI2 which HI2 stores the hard copy image data corresponding to the remaining part of the hard copy image.

When the display and printing processes are carried out as described above, the time required to display the soft copy image is not much different from that required in the conventional case. In addition, the printer 17 can be started before displaying the entire hard copy image, and the printing can be carried out while restoring the hard copy image. Furthermore, since a part of the hard copy image is already restored together with the soft copy image, the restoration time required for the hard copy image is reduced compared to that required in the conventional case, thereby greatly reducing the printing time.

In other words, when carrying out the printing process after restoring the soft copy image, a part of the hard copy image is already restored with the restoration of the soft copy image. For this reason, when the printer 17 is started after restoration of the soft copy image ends, the time required to restore the remaining part of the hard copy image is shorter than the time required to restore the entire hard copy image, and the printing time is thereby reduced. Normally, the soft copy image is displayed prior to the printing process. Hence, the printing time in this embodiment is short compared to the conventional case where the entire hard copy image is restored after the printing process starts.

Figure 12:
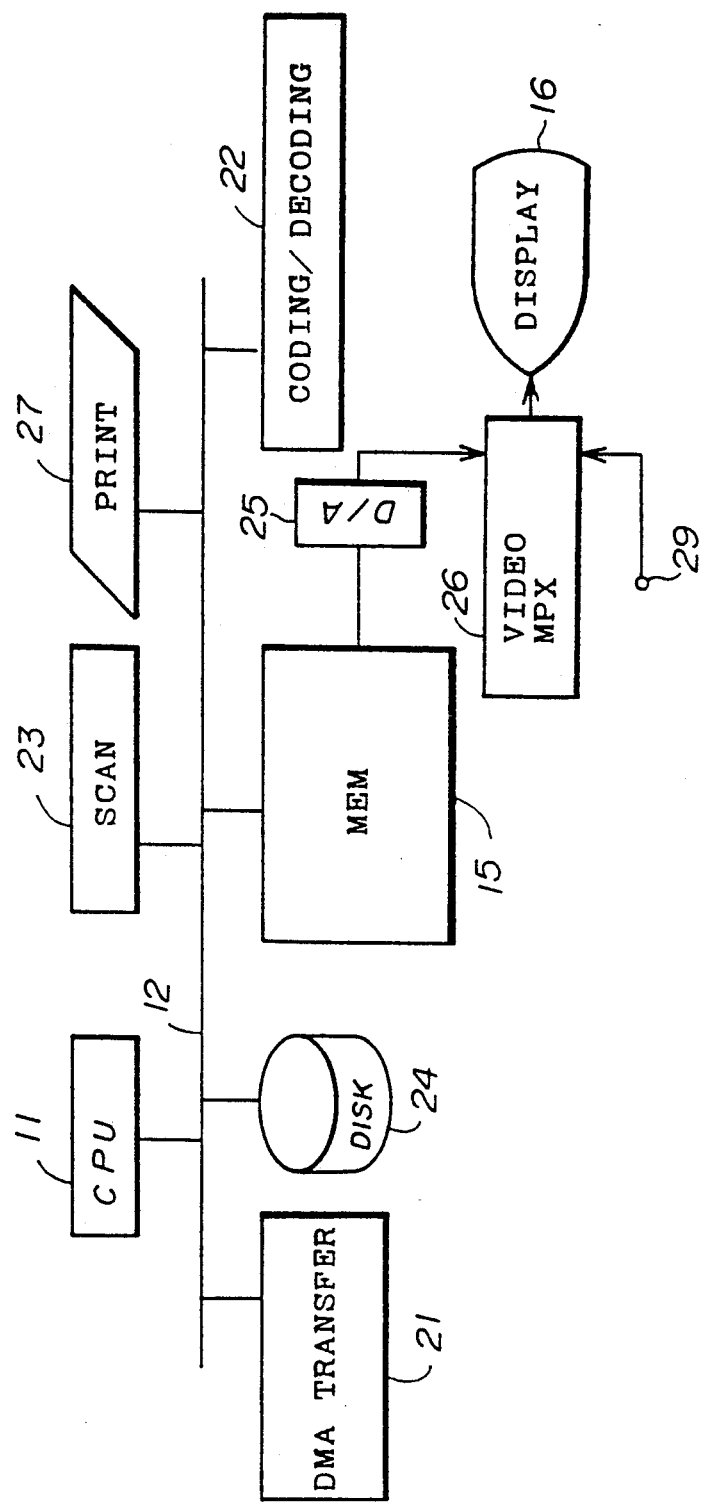
FIG. 12 is a system block diagram showing a second embodiment of the image reproduction system according to the present invention.

Next, a description will be given of a second embodiment of the image reproduction system according to the present invention, by referring to FIG. 12. In FIG. 12, those parts which are the same as those corresponding parts in FIG. 7 are designated by the same reference numerals, and a description thereof will be omitted.

The image reproduction system shown in FIG. 12 includes the CPU 11, the bus 12, the display memory 15, the display device 16, a direct memory access (DMA) transfer part 21, the coding/decoding part 22, a color scanner 23, a hard disk 24, a digital-to-analog (D/A) converter 25, a video multiplexer 26, and a color printer 27.

The DMA transfer part 21 uses the bus 12 in time division to make DMA transfer of data. The coding/decoding part 22 is made up of a hardware which codes and decodes the image at a high speed.

When storing the image, the color scanner 23 reads a natural image based on a control of the DMA transfer part 21, and the coding and compression are made in the coding/decoding part 22 in the manner described above in conjunction with FIGS. 6A through 6C so as to store the coded (compressed) data into the hard disk 24.

When displaying the image, the coded (compressed) data is read out from the hard disk 24 via the DMA transfer part 21 and is decoded in the coding/decoding part 22. The decoded (restored) data related to the natural image is stored in the display memory 15. The data read out from the display memory 15 is converted into an analog signal in the D/A converter 25 and is displayed on the display device 16. A terminal 29 receives video data from a personal computer (not shown), for example, and the video multiplexer 26 multiplexes the video data to the analog signal which is received from the D/A converter 25. Hence, in this embodiment, it is possible to display a multiplexed or superimposed image on the display device 16.

When printing the image, the data is read out from the display memory 15 via the DMA transfer part 21 and is transferred to the color printer 27. The color printer 27 prints the hard copy image according to a predetermined printing format.

In the described embodiments, the part of the hard copy image which is decoded and displayed together with the soft copy image may be an arbitrary part of the hard copy image and is not limited to a specific part. However, the display is normally made by a scan from the left to right from the top to bottom of the screen, and it is therefore convenient to select a predetermined number of lines at the top of the image as the part of the hard copy image which is decoded and displayed together with the soft copy image.

Further, the present invention is not limited to these embodiments, but various variations and modifications may be made without departing from the scope of the present invention.

What is claimed is:

1. A method of progressively reproducing a natural image by successively decoding and displaying data which are stored in memory means in at least three stages, said three stages including display of a retrieval image which is used for giving a general idea of the image, a soft copy image which has a sufficiently high resolution for display on display means and a hard copy image which has a sufficiently high resolution for printing on printer means, said data stored in the memory means including at least retrieval image data which is obtained by coding the natural image, soft copy image data which is obtained by coding a difference of the retrieval image and the soft copy image and hard copy image data which is obtained by coding a difference of the soft copy image and the hard copy image, said method comprising the steps of:

(a) decoding the retrieval image data read out from the memory means to display a retrieval image on the display means;

(b) decoding the soft copy image data and a predetermined part of the hard copy image data read out from the memory means to display on the display means a soft copy image in which a predetermined part thereof is replaced by a hard copy image part which is described by the predetermined part of the hard copy image data;

(c) decoding the hard copy image data read out from the memory means to display on the display means a hard copy image excluding said hard copy image part; and (d) printing the hard copy image on the printer means based on the hard copy image data decoded in said steps (b) and (c).

2. The method as claimed in claim 1, wherein said step (d) starts printing the hard copy image simultaneously as when the display of the hard copy image part in said step (b) starts.

3. The method as claimed in claim 1, wherein said step (b) displays the soft copy image by automatically transferring the predetermined part of the hard copy image data read out from the memory means to the display means after the soft copy image data read out from the memory means is transferred to the display means.

4. The method as claimed in claim 3, wherein said step (b) reads out the soft copy image data and the data related to the predetermined part of the hard copy image data from independent files within the memory means.

5. The method as claimed in claim 1, wherein said step (b) displays the soft copy image by transferring to the display means the predetermined part of the hard copy image data together with the soft copy image data read out from the memory means.

6. The method as claimed in claim 5, wherein said step (b) reads out the soft copy image data and the data related to the predetermined part of the hard copy image data from a single file within the memory means.

7. The method as claimed in claim 1, wherein the hard copy image part corresponds to a predetermined number of lines of the image which is displayed on the display means.

8. A natural image reproduction system for progressively reproducing a natural image by successively decoding and displaying stored data in at least three steps, said three steps including display of a retrieval image which is used for giving a general idea of the image, a soft copy image which has a sufficiently high resolution for display and a hard copy image which has a sufficiently high resolution for printing, said natural image reproduction system comprising:

display means;

printer means;

memory means for storing at least retrieval image data which is obtained by coding the natural image, soft copy image data which is obtained by coding a difference of the retrieval image and the soft copy image and hard copy image data which is obtained by coding a difference of the soft copy image and the hard copy image, decoding means for decoding the data stored in said memory means;

a bus coupled to said display means, said printer means, said memory means and said decoding means; and control means, coupled to said bus, for controlling a read operation of said memory means, a decoding operation of said decoding means and transfer of data on said bus, said control means controlling said decoding means so that said three stages include decoding the retrieval image data read out from said memory means to display a retrieval image on said display means, decoding the soft copy image data and a predetermined part of the hard copy image data read out from said memory means to display on said display means a soft copy image in which a predetermined part thereof is replaced by a hard copy image part which is described by the predetermined part of the hard copy image data, and decoding the hard copy image data read out from said memory means to display on said display means a hard copy image excluding said hard copy image part, said control means controlling said printer means to print the hard copy image based on the hard copy image data decoded in said decoding means.

9. The natural image reproduction system as claimed in claim 8, wherein said control means controls said printer means to start printing the hard copy image simultaneously as when said display means starts to display the hard copy image part.

10. The natural image reproduction system as claimed in claim 8, wherein said control means controls the display of the soft copy image by automatically transferring the predetermined part of the hard copy image data read out from said memory means to said display means after the soft copy image data read out from said memory means is transferred to the display means.

11. The natural image reproduction system as claimed in claim 10, wherein said memory means stores the soft copy image data and the data related to the predetermined part of the hard copy image data in independent files thereof.

12. The natural image reproduction system as claimed in claim 8, wherein said control means controls the display of the soft copy image by transferring to said display means the predetermined part of the hard copy image data together with the soft copy image data read out from said memory means.

13. The natural image reproduction system as claimed in claim 12, wherein said memory means stores the soft copy image data and the data related to the predetermined part of the hard copy image data in a single file thereof.

14. The natural image reproduction system as claimed in claim 8, wherein the hard copy image part corresponds to a predetermined number of lines of the image which is displayed on said display means.

15. The natural image reproduction system as claimed in claim 8, which further comprises input means, coupled to said bus, for inputting data related to the natural image, and coding means, coupled to said bus, for coding the data input from said input means, said control means controlling said coding means to store data coded therein into said memory means in the form of the retrieval image data, the soft copy image data and the hard copy image data.

* * * * *